Dec. 3, 1957  G. E. MARSH  2,815,097
RAILWAY CAR RETARDER OF THE TRACK BRAKE TYPE
Filed March 16, 1955  3 Sheets-Sheet 1

INVENTOR.
G.E. MARSH
BY
Forest B. Hitchcock
HIS ATTORNEY

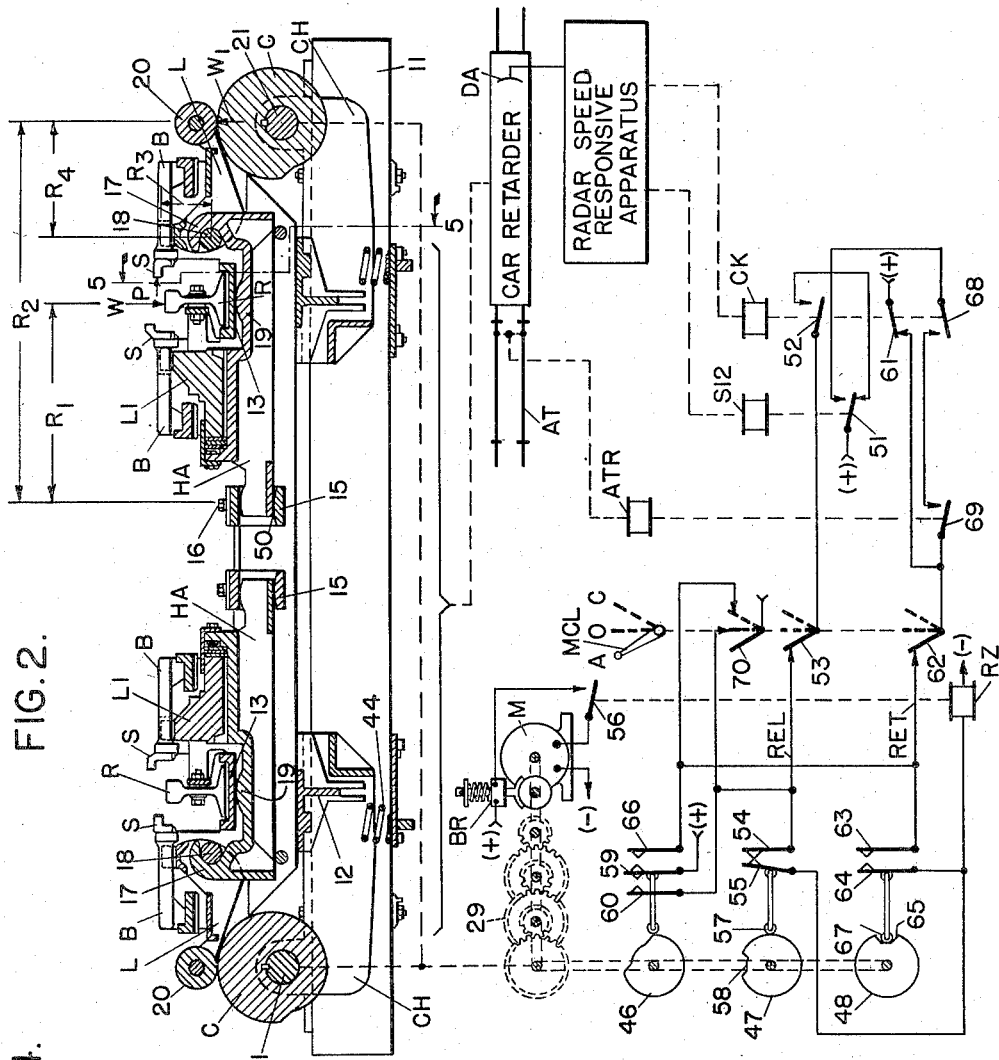
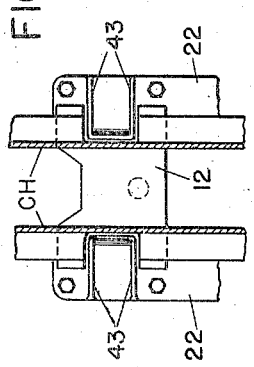

Dec. 3, 1957 G. E. MARSH 2,815,097
RAILWAY CAR RETARDER OF THE TRACK BRAKE TYPE
Filed March 16, 1955 3 Sheets-Sheet 3
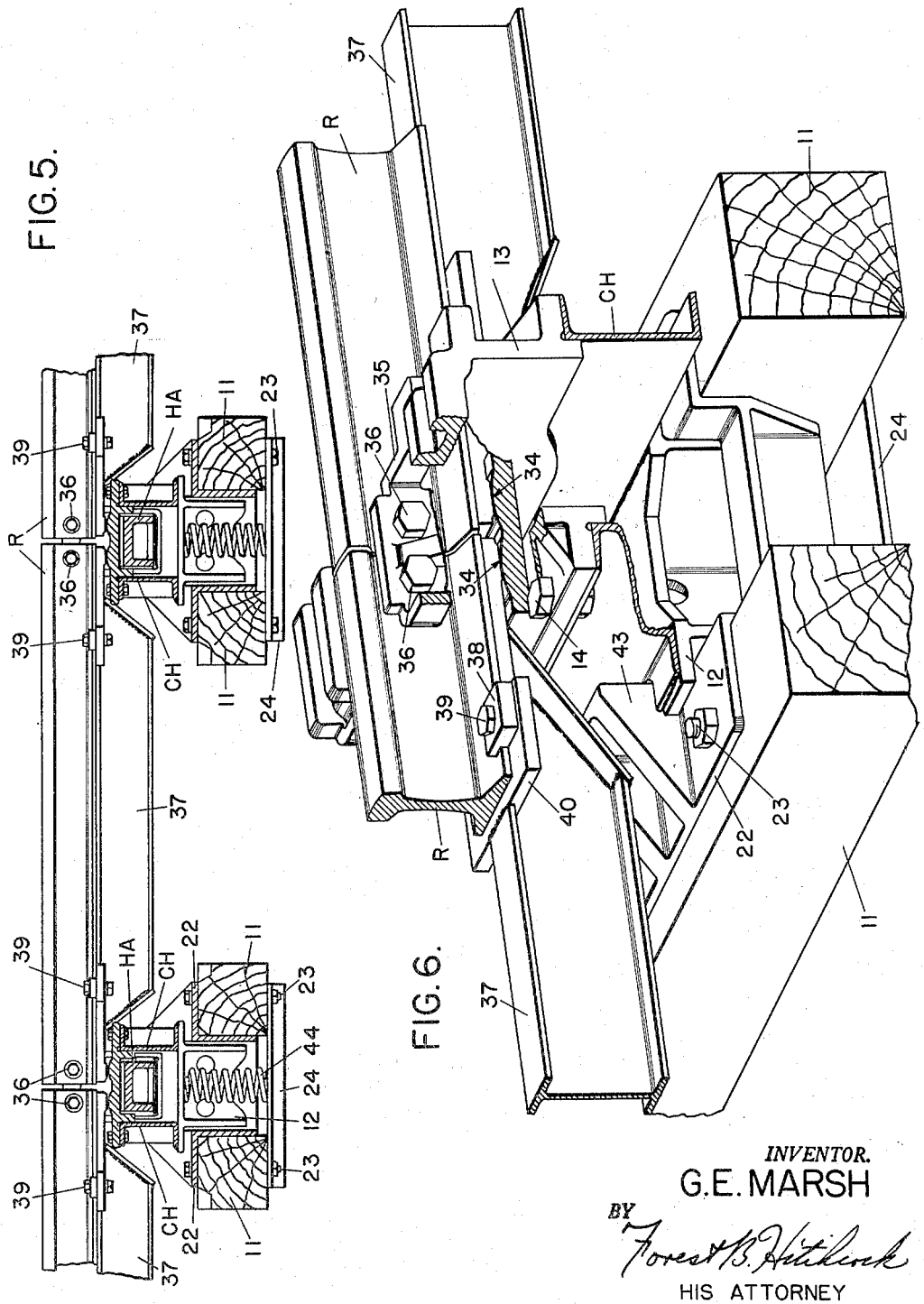
INVENTOR.
G.E. MARSH
BY
Forest B. Hitchcock
HIS ATTORNEY

United States Patent Office 2,815,097
Patented Dec. 3, 1957

2,815,097

RAILWAY CAR RETARDER OF THE TRACK BRAKE TYPE

Gareld E. Marsh, Rochester, N. Y., assignor to General Railway Signal Company, Rochester, N. Y.

Application March 16, 1955, Serial No. 494,796

1 Claim. (Cl. 188—62)

This invention relates to railway car retarders of the track brake type, and it more particularly pertains to car retarders of the weight-automatic type.

Car retarders of the weight-automatic type are considered to be car retarders wherein the pressures applied to the track rails by the weights of cars are utilized to actuate shoe beams to bear against car wheels and thus provide braking in a degree proportional to the weights of the cars. In a car retarder of this type, the track rails rest normally on the ties or on other supporting members, but when a car enters the car retarder and the wheels of the car spread the shoe beams apart, the rails are lifted off of the ties so that the pressure applied by the weight of the car may be fully transmitted as braking pressure to the shoe beams. The extent to which the track rails are lifted off of the ties is dependent upon the width of the car wheels involved, although the braking pressure is applied in substantially the same ratio to weight, irrespective of whether the rails are lifted a small fraction of an inch or a much greater distance off of the ties.

It is found in practice that the wheels of a car may vary considerably in width because of uneven wear, because of some of the wheels having been replaced, or because of other reasons. Thus in a car retarder of the type considered it may be that the wheels of the front axle of a car truck, for example, are wide enough to raise the track rails a considerable distance while the width of the wheels of the second axle is such as to raise the track rails only a relatively small amount. This sets up undesirable elevational stresses in the track rails, and such stresses in addition to being harmful to the track rails, can have an adverse effect upon the accuracy of the weight-automatic regulation of pressure of the shoe beams in accordance with car weights.

In view of these considerations that are brought about by the cars having wheels of different widths, the trackway through a car retarder, according to the present invention, is broken up into short track sections, each track section being of a length substantially equal to the lateral spacing between car retarder operating units.

Thus the rails of each of these short track sections are only about six feet in length, and they are pivotally secured at their ends to permit elevational articulation on arcuate ridges formed in chair members which in turn are secured to respective laterally spaced car retarder operating units extending transversely underneath the trackway at the adjoining ends of the short track sections. By this arrangement, possibilities of elevational stress in the track rails due to their being raised varying amounts where supported by the different operating units is eliminated because the continuity of the rails is broken over each operating unit, thus providing for elevational articulation of the trackway in accordance with the raising and lowering of the track rails at the points of support of the rails ends of chair members of the various retarder operating units.

An object of the present invention is to articulate the trackway elevationally through a car retarder to prevent the forming of elevational stresses in the track rails due to the raising of the track rails varying amounts by different operating units of a weight-automatic car retarder.

Another object of the present invention is to break up the trackway through a car retarder into track sections of lengths comparable to the spacing of car retarder operating units, the adjoining ends of the track sections being supported on common car retarder operating units.

Another object of the present invention is to secure the track rails of the various track sections at their ends pivotally elevationally at the various car retarder operating units.

Other objects, purposes and characteristic features of the present invention will be in part obvious from the accompanying drawings and in part pointed out as the description of the invention progresses.

In describing the invention in detail, reference is made to the accompanying drawings in which corresponding parts are identified in the several views by like reference characters, and in which:

Fig. 2 is an elevational sectional view of the car retarder taken along the section line 2—2 of Fig. 1, together with an illustration of a circuit organization for the control of the car retarder;

Fig. 3 is an elevational end view of a car retarder operating unit, shown partly in cross section;

Fig. 4 is a plan view of a portion of a car retarder operating unit shown partly in cross section, taken along the section line 4—4 of Fig. 3;

Fig. 5 is an elevational side view of a portion of trackway through a car retarder with parts of the car retarder removed and other parts shown in cross section; and Fig. 6 is an elevational side view in perspective of a portion of one of the car retarder operating units with some parts removed and some parts shown in cross section.

Figure 1:
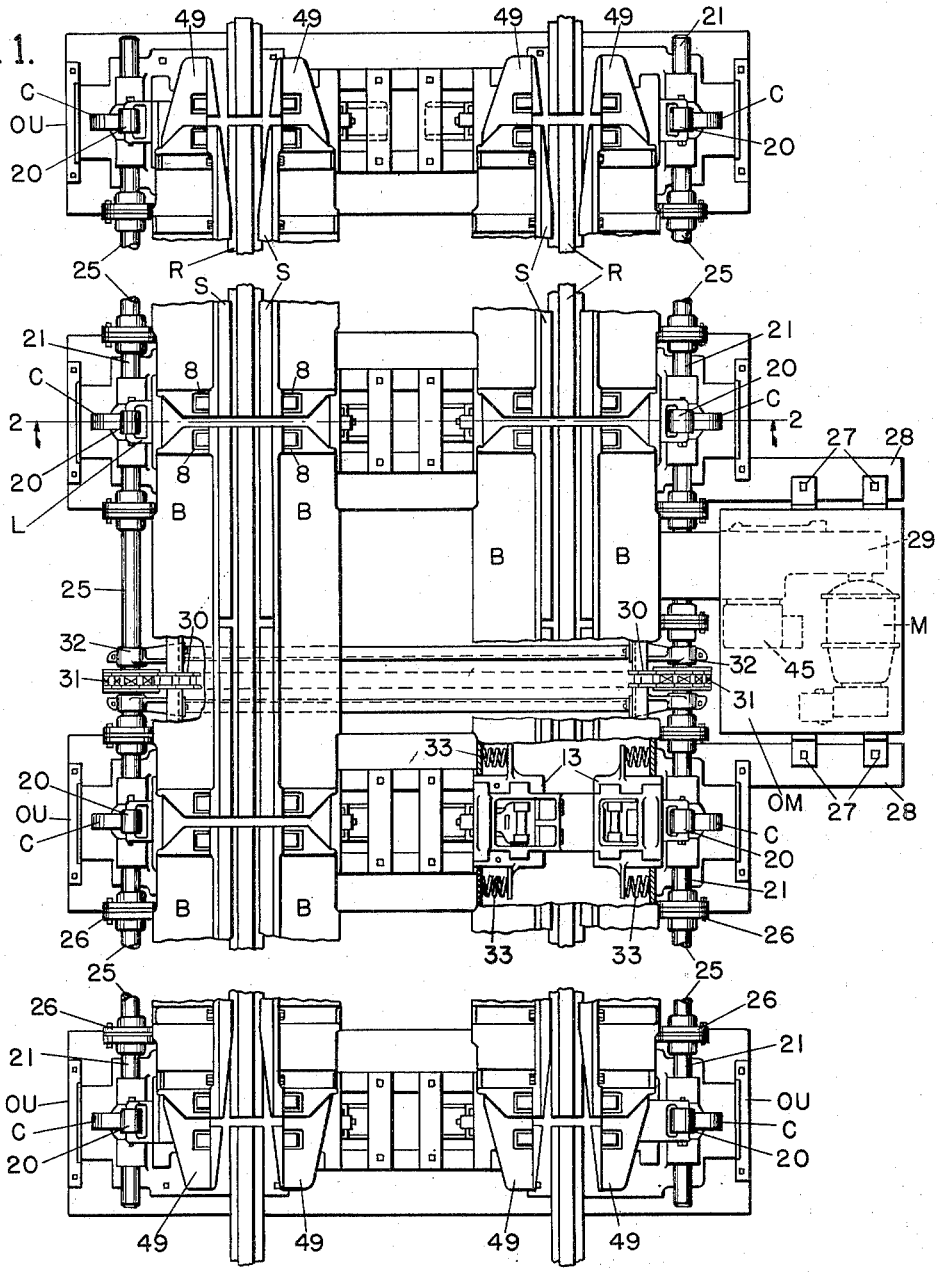
Fig. 1 is a plan view of a weight-automatic car retarder constructed according to the present invention and applied to a particular stretch of trackway.

With reference to Fig. 1, the car retarder is applied to a stretch of trackway that is broken up into several short track sections which are adjoining end to end through the car retarder. The car retarder comprises a number of retarder operating units OU which are laterally spaced from each other and which extend transversely relative to the trackway and beneath the track rails R. These units OU are laterally spaced substantially equal distances from each other and they support and actuate shoe beams B disposed end to end on both sides of the track rails R. The shoe beams B have secured thereto shoes S which bear against the sides of the wheels of cars passing through the car retarder.

Each of the track sections is of a length comparable to the spacing between the car retarder operating units OU so that the track rails R of each track section are supported at their opposite ends by next adjoining car retarder operating units OU. In other words, the track sections are of a length such that both of the track rails R are supported at their ends by adjoining car retarder operating units OU.

With reference to Figs. 2 and 3, each of the car retarder operating units OU comprises a pair of laterally spaced channels CH disposed between two railway ties 11 and extending transverse of the trackway and underneath the track rails R, a pair of hook arms HA disposed between the channels CH, floating levers L engaging the respective hook arm HA and operating the outside shoe beams B, fixed levers L1 engaging the inside shoe beams B, and cams C at the ends of the channels CH for supporting the track rails R through the channels CH, the hook arms HA and the levers L.

The channels CH of each of the car retarder operating units OU are tied together at their bases by bearing plates 12 (see Figs. 3 and 4) to the tops of which they are welded. The tops of the channels CH are tied together by chairs 13 under the respective track rails R. The channels CH are secured to the chairs 13 by bolts 14.

The hook arms HA in a car retarder operating unit OU are disposed end to end between the channels CH with their hooks extending outwardly and their inner ends supported on suitable arcuate pads 15 which are secured to the channels CH by bolts 16. The outer ends of the hook arms HA have hooks 17 formed therein which hook around pins 18 formed in the levers L. The hook arms HA have arcuate pads 19 formed in their upper surface structures that carry the pressure applied by the track rails through the chairs 13.

The levers L have rollers 20 at their outer ends which rest on the tops of the rotary cams C at the ends of each of the car retarder operating units OU. The cams C are keyed on short sections of shaft 21 which in turn are journaled in U-shaped bearing brackets 22 disposed between the respective pairs of ties that support the car retarder operating units OU. These bearing brackets are secured at a point near the ends of the ties by bolts 23. These bolts extend through the ties and through a tie connecting plate 24 at the bottom of the ties.

With reference to Fig. 1, the cam shafts 21 are connected together end to end along the respective sides of the trackway by suitable connecting shafts 25 and couplings 26.

A car retarder operating mechanism OM is fastened by bolts 27 to long ties 28 at one side of the trackway near the center of the car retarder longitudinally. This operating mechanism OM has a motor M coupled to rotate the cams C through suitable reduction gearing 29. The cams C on the opposite sides of the trackway are rotated in synchronism and in the same direction by a chain 30 extending beneath the track rails and connecting sprockets 31 which are keyed to the shafts 25 at the respective sides of the trackway. Suitable bearing brackets 32 are provided for supporting the shafts 25 at the points adjoining the sprockets 31.

The chairs 13 have several functions in that they provide anchorage for the track rails R, support points adapted for articulation of the track rails R, support and anchorage for the shoe beams B, and nests for springs 33 which are used in biasing the shoe beams B in a direction away from the track rails.

As is best shown in Fig. 6, the upper central surface of the chairs 13 is formed with two laterally spaced arcuate ridges 34 extending transversely beneath the track rails R so as to support respectively the adjoining ends of the articulated sections of rails R. The adjoining ends of the rails are secured to bracket arms 35 of chairs 13 by bolts 36, only one bolt 36 being used to secure each end of each of the rails R. It is further provided that space is left between the rail ends to allow free articulation elevationally of the respective sections of rail R independent of the adjoining sections.

With reference to Figs. 5 and 6, the track rails R do not rest directly on the ridges 34 in the chairs 13, but rather the track rails R are clamped to the upper surface of I-beams 37 by clamping plates 38 which are secured by bolts 39. The I-beams taper at the ends from bottom to top into plates 40 which rest upon the ridges 34 in the chairs 13 and to the tops of which the rails are secured by the clamp plates 38.

The shoe beams B are supported by ears 41 (see Fig. 3) of the chairs 13 which interlock with recesses 42 formed in the ends of the shoe beams B. This permits the shoe beams to be articulated laterally as the cars pass through the retarder.

The car retarder operating units OU are held in alignment with the trackway by the bearing plates 12 which are fitted around elevational abutments 43 (see Fig. 6) which are formed in both sides of the bearing brackets 22. These abutments 43 keep the operating units OU in alignment with the trackway and serve as thrust bearings to resist the tendency of the brake shoes to follow the movement of the car wheels.

The shoe beams B (see Fig. 1) have openings 8 formed therein near their ends for engagement of operating levers L for the shoe beams B disposed outside of the track rails R, and for engagement of levers L1 for the shoe beams B disposed inside of the track rails R.

It is preferable that springs 44 be provided beneath the operating units OU at points below the track rails R for the purpose of supporting a substantial portion of the dead weight of the car retarder operating units OU. The reason for this is to make the shoe pressure as directly proportional to the weights of the cars as possible. If it were not for these springs 44, pressure would be applied to the wheels of a car by the dead weight of the car retarder operating units, which pressure might be too great for light cars.

The car retarder has a circuit controller 45 (see Fig. 1) that has contact operating cams 46, 47 and 48 (see Fig. 2) so coupled to the reduction gearing 29 as to be driven at the same rate as the rotation of the cams C.

Having thus considered the general structure of one embodiment of the weight-automatic car retarder provided according to the present invention, consideration will now be given as to the mode of operation of the car retarder.

The normal condition of the car retarder is as is illustrated in the drawings, with the rollers 20 of the levers L raised to their maximum high position by contacting the highest points of the cams C. Because of there being no car wheel between the brake shoes S under the assumed normal conditions, the shoes S are normally closed to a spacing less than the thickness of the narrowest car wheel, and in accordance with this condition of the brake shoes S, the car retarder operating units OU are resting on the horizontal surfaces of the bearing brackets 22.

As a means for initially spreading the brake beams B when a car enters a car retarder, the car retarder has short end sections 49 that are flared outwardly from the track rails R. These ends 49 guide the wheels of a car while entering the car retarder between the first full length sets of shoe beams B. These first full length shoe beams B are flared at their ends adjoining the end sections 49.

Thus, when a car initially enters the car retarder, its wheels spread the first full length sets of shoe beams B, and in doing so, the levers L for associated car retarder operating units OU are rotated upwardly about the point of contact of the rollers 20 (see Fig. 2) with the upper surfaces of the cams C. This raises the pins 18 and thus raises the hook arms HA. The hook arms HA raise the chairs 13 and the associated sections of rails R which the chairs 13 support, and because of the chairs 13 being raised, the channels CH are also raised off of their normal positions on top of the bearing brackets 22. The raising of the track rails R takes place, however, only for the sections of rail R associated with operating units OU that are supporting the shoe beams B which are being spread apart by the car wheels. From this mode of operation, it will be noted that the action in raising the track rails R takes place just ahead of a car as it progresses through the car retarder raising the respective sections of rail R, as the car progresses, in a wave-like motion ahead of the car.

The extent to which the track rails are raised by the spreading of the shoe beams B is determined by the widths of the different wheels which may vary considerably. For the narrowest car wheel, the channels CH may be raised only a relatively small fraction of an inch off of the bearing brackets 22, but for a relatively broad wheel, the channels CH may be raised nearly two inches off of the bearing brackets 22. As has been heretofore pointed out, the extent to which the channels CH are raised is immaterial in determining the pressures applied by the shoe beams B in that the pressure is regulated in accordance with the weights applied to the track rails R, irrespective of how far the channels CH are suspended above the bearing brackets 22.

It will be readily apparent from the above description that the articulation of the track rails R is necessary for the purpose of rendering the pressures applied by the shoe beams B as being accurately proportional to the car weights as applied to the track rails above the respective car retarder operating units OU, without having the pressures distorted because of spring stresses set up in the track rails R as would be the case if the track rails R were to be solid from one end of the car retarder to the other, rather than being articulated as provided according to the present invention.

It should be readily apparent that the amount of pressure applied by the shoe beams B has a ratio to the weight of a car as applied to an associated car retarder operating unit OU in accordance with the lengths of certain moment arms involved. It has been found in practice that good operation is obtained where the ratio of shoe pressure to weight applied to the track rail is approximately 2 to 1.

In considering how this ratio is obtained, let W represent the load applied to one of the track rails R of a typical car retarder operating unit OU, $W_1$ represent the load applied to the right-hand cam C of Fig. 2, P represent the pressure applied by brake shoes S to a car wheel, $R_1$ represent the moment arm from the pivot point 50 of the right-hand hook arm HA of Fig. 2 to the point of application of the load W to the associated track rail R, $R_2$ represent the moment arm from the pivot point 50 to the right-hand point of support of the weight $W_1$, $R_3$ represent the moment arm from the pin 18 to the point of application of the pressure P by the brake shoes S, and $R_4$ represent the moment arm from the pivot pin 18 to the right-hand point of support of the weight $W_1$.

For the purpose of facilitating an understanding of the calculations of the pressure ratio, it will be assumed first that the calculations are for a single rail car retarder wherein the structure is similar except that the inside ends of the hook arms HA rest on the ties 11 rather than being supported by channels CH as is illustrated in the drawings. To further facilitate an understanding of the calculations, it will be assumed that this point of support and the point of support of the weight $W_1$ on the cams C are equi-distant from the associated track rail R.

Since all of the parts are in equilibrium, we can take moments about the pivot point 50 wherein:

$$W_1 R_2 = W R_1$$

$$W_1 = \frac{W R_1}{R_2}$$

also by moments:

$$P R_3 = W_1 R_4$$

Substituting for $W_1$, $$P R_3 = \frac{W R_1}{R_2} \times R_4$$

and $$P = W \frac{R_1 R_4}{R_2 R_3}$$

thus the lever ratio is $$\frac{R_1 R_4}{R_2 R_3}$$

and $$P : W = R_1 R_4 : R_2 R_3$$

It will be noted that under the assumed conditions where the hook arms HA are supported on the ties 11 rather than by the channels CH, half of the weight W applied to the track rail R under consideration is supported by the ties as applied through the pivot point 50 of the hook arm HA, and the other half of the weight is applied to the top of the cam C as a pressure $W_1$. This pressure $W_1$ is the only useful pressure for conversion into brake shoe pressure, and thus under such an organization only half of the pressure applied to the track rail could be converted into useful braking pressure. If, however, the weights applied to the track rails in a double rail car retarder such as is disclosed in this embodiment of the present invention, the weight of the car is entirely supported by the car retarder operating mechanisms, and thus if it is assumed that the weight of a car is relatively equally distributed, half of the weight of the car is applied to the point of support of the car retarder operating units at one side of the track, and the other half is applied to the support at the other side of the track. Thus, in a double rail car retarder, all of the weight applied to the track rails is used in applying braking pressure by the brake shoes S.

Having thus considered how shoe pressure is proportional to weight, consideration will now be given as to the mode of operation in selectively rendering a car retarder effective or ineffective. This type of operation is desirable in an automatic car retarder control system such as is disclosed, for example, in the prior application of N. C. L. Brown, Ser. No. 428,012, filed May 6, 1954. In such a system, it is desirable to be able to open a car retarder quickly so as to release a car when its speed has been reduced to a predetermined value.

Radar speed responsive apparatus, such as is illustrated in block form in Fig. 2, is connected to a directional antenna DA which is preferably disposed between the track rails near the exit end of the associated car retarder. In accordance with the presence of a car within the immediate vicinity of the car retarder, the radar speed responsive apparatus energizes a check relay CK in accordance with the presence of the car and a speed relay S12 is picked up if the speed of the car is above a predetermined value. When the speed of a car within the car retarder is reduced to the predetermined value, the speed relay S12 becomes dropped away, and the dropping away of this relay is effective to release the car retarder and permit the car to roll free of retardation. This type of a control is provided by the selective energization of a car retarder control relay RZ, and, as illustrated in Fig. 2, a three position manual control lever MCL is provided in the control circuits to select between automatic and manual control of the associated car retarder.

To open the car retarder according to the circuit organization of Fig. 2, the relay RZ can become energized upon the dropping away of the speed relay S12 by the energization of a circuit extending from (+), including back contact 51 of relay S12, front contact 52 of relay CK, contact 53 of lever MCL in its left-hand position, contact fingers 54 and 55 of the car retarder circuit controller, and winding of relay RZ, to (−). Relay RZ when energized closes a circuit for the motor M including the winding of a brake BR and front contact 56 of relay RZ. In accordance with this energization of the motor M, the cams C become rotated in a clockwise direction, and the cams 46, 47 and 48 of the car retarder circuit controller are similarly rotated. Thus, when the cams C have been rotated through substantially 90 degrees, roller 57 drops into notch 58 in the circuit controller cam 47 and opens the circuit for relay RZ at contact fingers 54 and 55. It will be noted that in case the pickup circuit just described for the relay RZ is opened prior to the completion of operation of the car retarder to its full open position, a circuit is maintained through contact fingers 59 and 60 of the circuit controller to maintain relay RZ energized until the car retarder is fully opened.

It is particularly desirable to maintain the car retarders normally closed as a matter of safety, and thus as soon as a car has passed out of a car retarder so as to cause the relay CK to become dropped away, the car retarder is automatically operated to its closed position (assuming it has been opened as described above). The circuit by which relay RZ is energized for operation of the car retarder to a closed position extends from (+), including back contact 61 of relay CK, contact 62 of lever MCL in its left-hand position, contact fingers 63 and 64 of the circuit controller and winding of relay RZ, to (—). The contact fingers 63 and 64 are closed at this time because the recess 65 of the cam 48 is in a position rotated 90 degrees clockwise at this time from the position in which it is shown. To insure complete operation, once operation to close the car retarder has been initiated, the closure of contact fingers 59 and 66 applies energy to the control circuit for relay RZ so that this relay is maintained energized until the cam 48 has rotated through substantially 270 degrees so that the roller 67 drops into the recess 65 of the cam 48 to open the contact fingers 63 and 64.

If a car accelerates in speed after the car retarder has been opened, and the rear of the car still occupies an approach track section AT, energy can be applied to the relay RZ for closing the car retarder even though the back contact 61 of the check relay CK is open at this time. The circuit for providing this mode of operation extends from (+), including front contact 51 of relay S12, front contact 68 of relay CK, front contact 69 of relay ATR, contact 62 of lever MCL in its left-hand position, contact fingers 63 and 64 of the circuit controller and winding of relay RZ, to (—).

For manual control of operation of the car retarder illustrated in Fig. 2, the lever MCL can be operated to its center position to open the car retarder, or to its right-hand position to close the car retarder. The operation of lever MCL to its center position applies energy through contact 70 of lever MCL to the release control wire REL, and the operation of this lever to its right-hand position applies energy through contact 70 to the retardation control wire RET.

Having thus described one embodiment of a car retarder constructed according to the present invention, it is desired to be understood that this form is selected principally to facilitate the disclosure of the invention rather than to limit the number of forms which the invention may assume, and it is to be further understood that various adaptations, modifications and alterations may be made to the specific form shown in accordance with the requirements of practice within the scope of the appending claim.

What I claim is:

A car retarder of the track brake type associated with a stretch of railway track comprising in combination, a plurality of track brake operating units disposed transverse of the stretch of railway track and uniformly spaced laterally from each other successively, each of said operating units having a pair of laterally spaced channels extending integrally underneath both of the track rails, and each of said operating units having chairs disposed beneath the respective track rails and secured to the upper sides of the said channels, each of said chairs having two laterally spaced ridges formed therein and extending transversely underneath the associated track rails, said trackway through the car retarder being divided into a plurality of sections and each of said sections being of a length comparable to the lateral spacing of said operating units and each of the track rails of each section being supported at its respective ends on said ridges of different chairs, and a plurality of shoe beams disposed end to end longitudinally on both sides of the track rails and operable by said operating unit to apply pressure to the side of the wheels of a car in accordance with the car weight.

References Cited in the file of this patent
UNITED STATES PATENTS 2,238,772    Clausen                Apr. 15, 1941

FOREIGN PATENTS 651,624    France                Oct. 15, 1928